United States Patent
Guibert

(10) Patent No.: US 11,665,157 B2
(45) Date of Patent: May 30, 2023

(54) SYSTEMS AND METHODS FOR AUTHENTICATING USERS WITHIN A COMPUTING OR ACCESS CONTROL ENVIRONMENT

(71) Applicant: ASSA ABLOY AB, Stockholm (SE)

(72) Inventor: Nicolas Guibert, Argenteuil (FR)

(73) Assignee: ASSA ABLOY AB, Stockholm (SE)

( * ) Notice: Subject to any disclaimer, the term of this patent is extended or adjusted under 35 U.S.C. 154(b) by 574 days.

(21) Appl. No.: 16/584,230

(22) Filed: Sep. 26, 2019

(65) Prior Publication Data

US 2020/0106771 A1 Apr. 2, 2020

Related U.S. Application Data

(60) Provisional application No. 62/737,186, filed on Sep. 27, 2018.

(51) Int. Cl.
| | |
|---|---|
| *H04L 29/06* | (2006.01) |
| *H04L 9/40* | (2022.01) |
| *H04L 9/32* | (2006.01) |
| *G06V 20/30* | (2022.01) |
| *G06V 40/16* | (2022.01) |

(52) U.S. Cl.
CPC .......... *H04L 63/0861* (2013.01); *G06V 20/30* (2022.01); *G06V 40/16* (2022.01); *H04L 9/3231* (2013.01); *H04L 63/045* (2013.01)

(58) Field of Classification Search
None
See application file for complete search history.

(56) References Cited

U.S. PATENT DOCUMENTS

| | | | | |
|---|---|---|---|---|
| 6,317,834 | B1 * | 11/2001 | Gennaro | G07C 9/37 713/182 |
| 6,636,973 | B1 * | 10/2003 | Novoa | G06F 21/32 340/5.82 |
| 8,869,238 | B2 * | 10/2014 | Gopalakrishna | G06Q 20/4016 713/168 |
| 2012/0198531 | A1 * | 8/2012 | Ort | H04W 12/06 709/227 |
| 2014/0282964 | A1 * | 9/2014 | Stubblefield | H04L 63/0853 726/7 |
| 2017/0264608 | A1 * | 9/2017 | Moore | G07C 9/257 |
| 2017/0339140 | A1 * | 11/2017 | Sudduth | H04L 63/0861 |
| 2019/0034606 | A1 * | 1/2019 | Mapen | G06V 40/19 |
| 2019/0213312 | A1 * | 7/2019 | Tussy | G06V 40/40 |

* cited by examiner

*Primary Examiner* — Piotr Poltorak
(74) *Attorney, Agent, or Firm* — Schwegman Lundberg & Woessner, P.A.

(57) ABSTRACT

Authentication methods and systems are disclosed. In one non-limiting example, an authentication method may include detecting a user within an image, determining that the image further includes additional recognizable data, analyzing the additional recognizable data and one or more biometric features of the user, and determining that the additional recognizable data and the one or more biometric features of the user correspond to valid additional recognizable data and valid biometric features of an enrolled user, respectively. The method may further include enabling the user to access a protected asset based on determining that the additional recognizable data and the one or more biometric features of the user correspond to valid additional recognizable data and valid biometric features of an enrolled user, respectively.

19 Claims, 12 Drawing Sheets

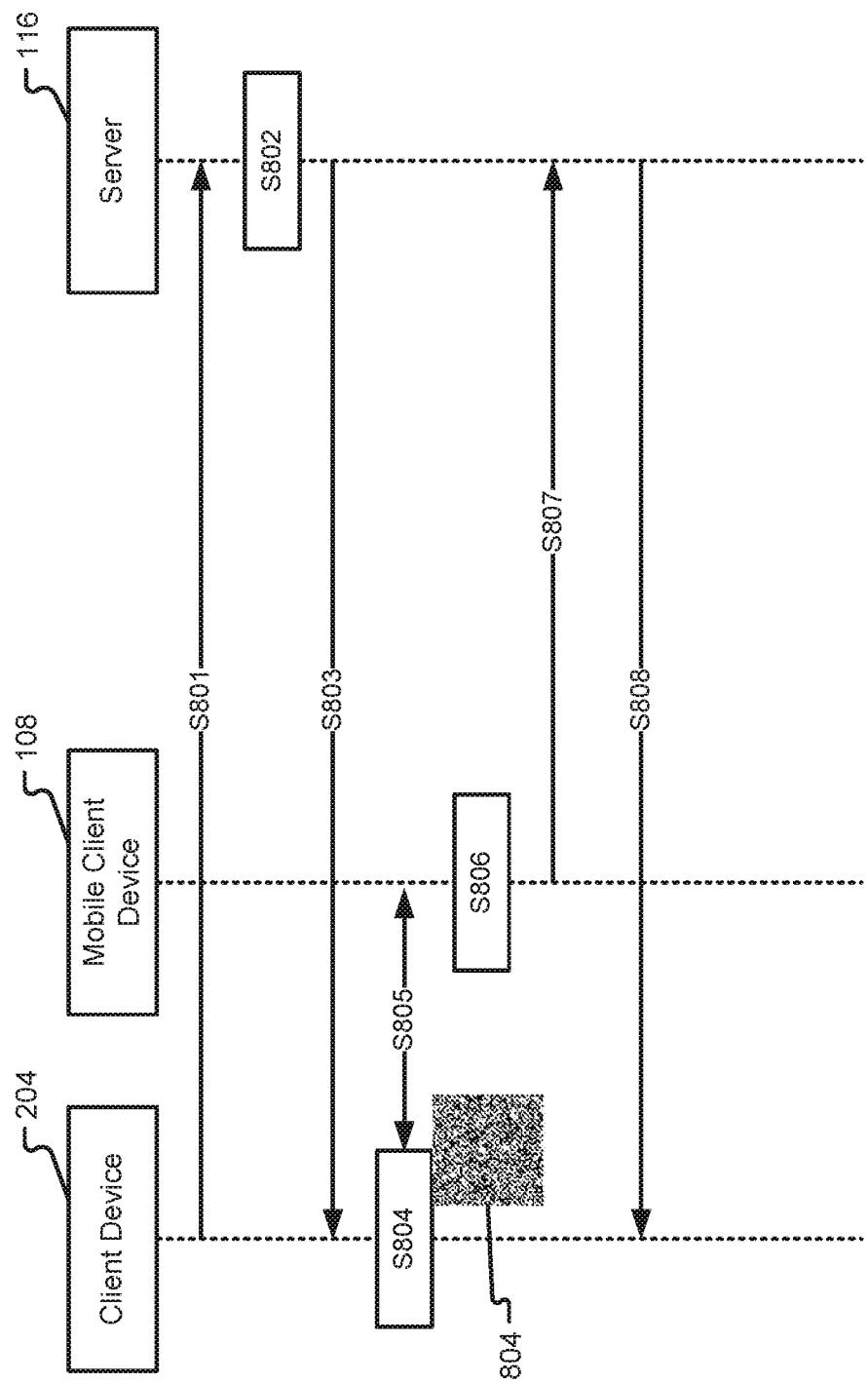

SYSTEMS AND METHODS FOR AUTHENTICATING USERS WITHIN A COMPUTING OR ACCESS CONTROL ENVIRONMENT

CROSS-REFERENCE TO RELATED APPLICATION(S)

This application claims the benefit of U.S. Prov. Pat. Appl. No. 62/737,186, titled "Systems and Methods for Authenticating Users Within a Computing or Access Control Environment," filed Sep. 27, 2018, which is hereby incorporated by reference herein in its entirety.

FIELD OF THE DISCLOSURE

Embodiments of the present disclosure relate to authentication and, more specifically, to various systems and methods of authenticating users in various computing environments and/or access control systems.

BACKGROUND

Authentication methods and systems often have to balance the security of the system with the user experience during the authentication process. In general, usability or user experience is often at odds with the system security or strength of authentication. On the one hand, if an authentication process is highly useable or "user friendly", then that authentication process is not as secure as other authentication processes which are less user friendly. An ideal scenario would be to develop an authentication process that simultaneously improves the user experience while increasing system security.

SUMMARY

It is with respect to the above that embodiments of the present disclosure were contemplated. In particular, embodiments of the present disclosure contemplate various authentication methods and systems for executing such methods. One non-limiting example of such an authentication method includes:

detecting a user within an image;
determining that the image frame further comprises additional recognizable data;
analyzing the additional recognizable data and one or more biometric features of the user;
determining that the additional recognizable data and the one or more biometric features of the user correspond to valid additional recognizable data and valid biometric features of an enrolled user, respectively; and enabling the user to access a protected asset based on determining that the additional recognizable data and the one or more biometric features of the user correspond to valid additional recognizable data and valid biometric features of an enrolled user, respectively.

In some embodiments, the additional recognizable data comprises a unique code depicted by a user interface of a client device that is adjacent to the one or more biometric features of the user within the image. In some embodiments, the one or more biometric features reside within a first region of interest within the image, wherein the additional recognizable data resides within a second region of interest within the image, and wherein the first region of interest is separate from the second region of interest.

In some embodiments, the method may further include determining a confidence score for a recognition of the additional recognizable data from the image and notifying the user to adjust a presentation of the additional recognizable data in response to the confidence score being less than a predetermined minimum threshold score.

In some embodiments, the additional recognizable data comprises a One Time Password generated in response to the user initiating an authentication process.

In some embodiments, the method may further include generating the additional recognizable data at a mobile client device and rendering the additional recognizable data via a user interface of the mobile client device such that the additional recognizable data is capable of being detected within the image. Alternatively or additionally, the additional recognizable data comprises a device type of a mobile client device used to generate the additional recognizable data.

In some embodiments, the one or more biometric features comprise facial features of the user and wherein determining that the one or more biometric features of the user correspond to valid biometric features of an enrolled user comprises generating a biometric template based on the one or more biometric features and comparing the biometric template with a stored template that was generated based on the valid biometric features of the enrolled user.

In another embodiment, a method is provided that comprises:

detecting a user within an image;
analyzing one or more biometric features of the user;
determining that the one or more biometric features of the user correspond to a valid biometric feature or features of an enrolled user;
parallel with or in response to determining that the one or more biometric features of the user correspond to a valid biometric feature or features of an enrolled user, generating one or more Graphical User Interface (GUI) elements that enable the user to input a code;
presenting the one or more GUI elements to the user;
receiving the code input by the user; and
comparing the code input by the user with a valid code to determine whether or not to enable the user access to a protected asset.

In some embodiments, the one or more GUI elements depict data in a randomized layout and wherein the data depicted in the one or more GUI elements include inputs for the valid code and additional inputs not in the valid code. As a non-limiting example, the valid code may comprise a One Time Password generated in response to determining that the one or more biometric features of the user correspond to valid biometric features of an enrolled user.

In some embodiments, the method may further include analyzing the user's gaze with respect to the one or more GUI elements and determining that the user's gaze matches the valid code.

In some embodiments, the one or more GUI elements are presented via a user interface of a client device that is used to detect the image.

In some embodiments, determining that the one or more biometric features of the user correspond to a valid biometric feature or features of an enrolled user is performed in parallel with presenting the one or more GUI elements to the user.

In another embodiment, a method is provided that comprises:

detecting a user within an image;
analyzing one or more biometric features of the user;

determining that the one or more biometric features of the user correspond to a valid biometric feature or features of an enrolled user;

in response to determining that the one or more biometric features of the user correspond to a valid biometric feature or features of an enrolled user, identifying a client device associated with the user; and requiring the identified client device to successfully complete a challenge to continue authentication.

In some embodiments, the challenge comprises a push notification and wherein the client device comprises a messaging address that is maintained in a user authentication database in association with an identification of the user and in association with the one or more biometric features of the user.

In some embodiments, the push notification causes the client device to display a prompt to the user that includes an approve input and a decline input. The push notification may be generated automatically and without user input.

In some embodiments, the image of the user is detected with a first client device that is different from the client device identified as being associated with the user.

In some embodiments, the one or more biometric features comprise facial features of the user, wherein determining that the one or more biometric features of the user correspond to a valid biometric feature or features of an enrolled user comprises generating a biometric template based on the one or more biometric features and comparing the biometric template with a stored template that was generated based on the valid biometric feature or features of the enrolled user, and wherein the client device sends back a signed confirmation to an authentication server to notify a resource to access of the authentication success or failure.

In another embodiment, a method is provided that comprises:

generating a challenge;

causing the challenge to be displayed to the user;

receiving a response from a client device that includes information displayed in the challenge; and enabling the user to access a protected asset in response to determining that the response from the client device included the information displayed in the challenge.

In some embodiments, the challenge comprises a unique optical code that is encoded and signed.

In some embodiments, the method further comprises determining that the signature of the unique optical code is valid prior to causing the challenge to be displayed to the user and signing the response with the client device thereby enabling a server to establish a level of trust with the client device prior to determining that the response from the client device includes the information displayed in the challenge.

In some embodiments, the unique optical code comprises a QR code or barcode.

In some embodiments, the challenge comprises a web token that is encoded inside an optical code.

In another embodiment, a method is provided that comprises:

receiving a request to authenticate the user;

identifying a client device associated with the user;

transmitting a challenge to the client device to solicit approval from the user to continue authentication;

receiving a response to the challenge that indicates approval to continue authentication;

causing a user interface of the client device to include a signature section;

receiving a user signature from a user input within the signature section;

comparing the user signature from the user input with a valid user signature; and conditioning user access to a protected asset based on whether or not the user signature from the user input matches the valid user signature within a predefined tolerance.

In some embodiments, the user interface further includes a prompt section adjacent to the signature section.

In some embodiments, the comparison of the user signature from the user input with the valid user signature is performed at the client device.

In some embodiments, the comparison of the user signature from the user input with the valid user signature is performed at an authentication server that transmitted the challenge to the client device.

In some embodiments the method may further comprise performing facial recognition of the user and identifying the client device associated with the user based on results of the facial recognition of the user.

Another aspect of the present disclosure provides a system having an authentication server configured to perform any of the methods depicted and described herein.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale:

FIG. 8 is a diagram depicting a fourth authentication method in accordance with at least some embodiments of the present disclosure;

DETAILED DESCRIPTION

Copyright and Legal Notices

A portion of the disclosure of this patent document includes material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
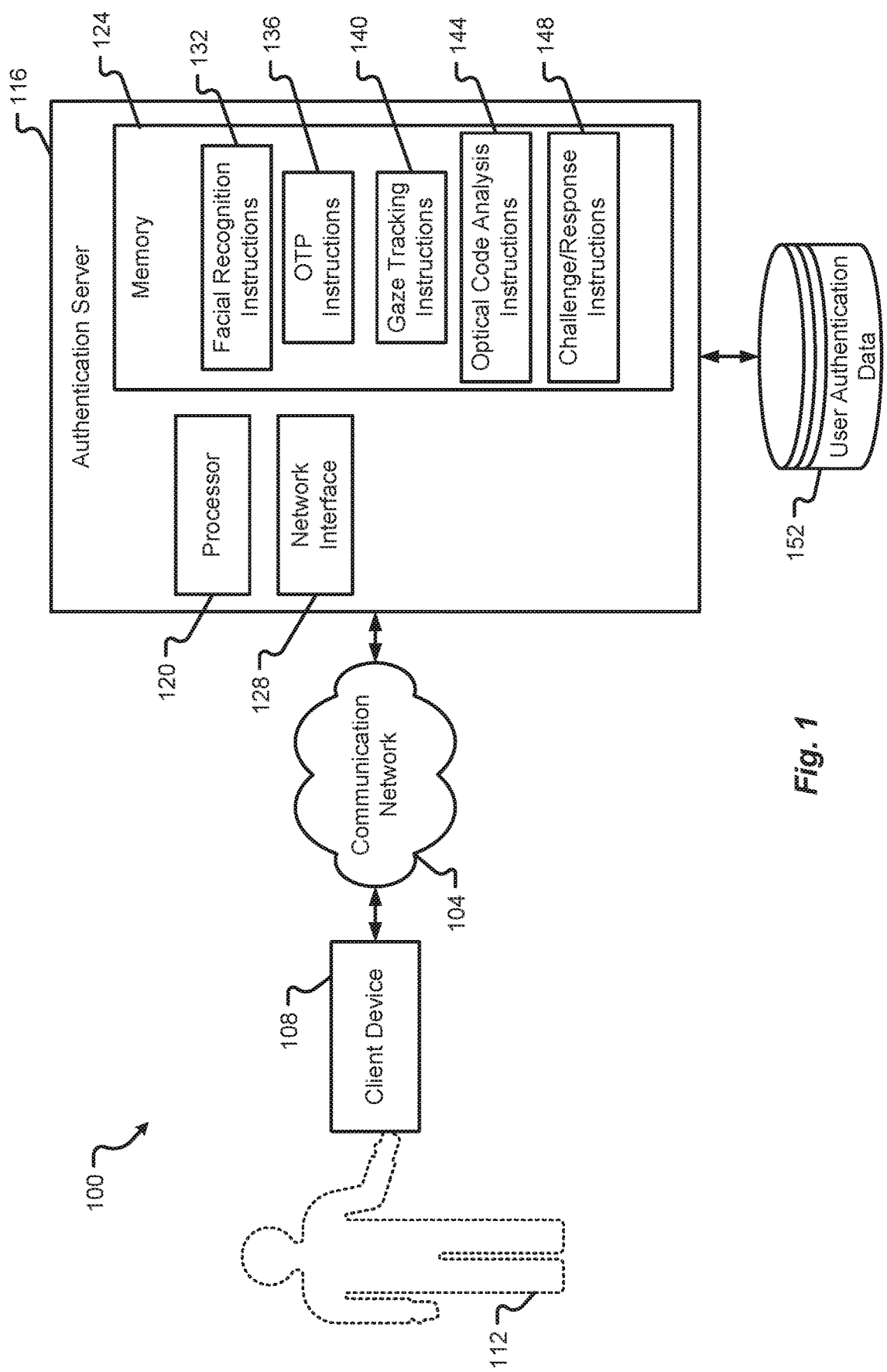
FIG. 1 is a block diagram depicting a system that supports one or more authentication methods in accordance with at least some embodiments of the present disclosure.

With reference to FIG. 1, an illustrative system 100 will be described in accordance with at least some embodiments of the present disclosure. The system 100, in some embodiments, may include one or more computing devices operating in cooperation with one another to provide one or more authentication functions. The components of the system 100 may be utilized to facilitate one, some, or all of the authentication methods or portions thereof without departing from the scope of the present disclosure.

The system 100 is shown to include a communication network 104 that facilitates communications between one or more client devices 108 and one or more server resources 116.

In some embodiments, the various client devices 108 and server(s) 116 may be configured to communicate using various nodes or components of the communication network 104. The communication network 104 may comprise any number of communication networks, and may also comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof. Although the communication network 104 is depicted as a single network, it should be appreciated that the communication network 104 may include a plurality of different networks and/or network types without departing from the scope of the present disclosure.

The client devices 108 may correspond to any type of computing resource that includes a processor, computer memory, and a user interface. The client devices 108 may also include one or more network interfaces that connect the client device 108 to the communication network 104 and enable the client device 108 to send/receive packets via the communication network 104. Non-limiting examples of client devices 108 include personal computers, laptops, mobile phones, smart phones, tablets, wearables, tokens, etc. A token may generally include a physical device used to gain access to an electronically restricted area, and may, for example, be a disconnected (e.g., neither having a physical or logical connection to a client computer) or connected token, a smartcard, a contactless token, such as a RFID token, a programmable token, etc. In some embodiments, the client device 108 is configured to be used by and/or carried by a user 112. As will be discussed in further detail herein, the user 112 may utilize one or several client devices 108 to authenticate themselves to the server 116.

In some embodiments, a client device 108 may be configured to access or utilize the server 116 with one or several applications stored in memory of the client device 108. As an example, a client device 108 may access the server 116 with assistance from a browser application running on the client device 108. Other types of applications such as mobile applications, transaction applications, communication applications, etc. may also be used on the client device 108 to access the client service resource(s) 116.

Although FIG. 1 only depicts the user 112 as having a single client device 108, it should be appreciated that a single user 112 may possess two or more client devices 108. The client devices 108 owned and/or carried by the user 112 may be of the same type or of a different type. For instance, the user 112 may carry two different mobile communication devices (e.g., smartphones) as two different client devices 108. Alternatively or additionally, a user 112 may utilize a mobile communication device as one client device 108 and then utilize a Personal Computer (PC), laptop, or the like as a second client device 108. One or multiple client devices 108 may be used in connection with performing an authentication process with the user 112.

The authentication server 116 or components thereof may be provided as a single server, multiple servers or in a cloud-computing environment. In any scenario, the authentication server 116 may be connected to the communication network 104 via a network interface 128 and resources of the server 116 (e.g., the processor 120 and instructions stored in memory 124) may be made available to one or multiple client devices 108. For instance, the authentication server 116 may be used to authenticate users 112 within a particular computing platform or across multiple different computing platforms.

The authentication server 116 may be configured to execute one or multiple different types of authentication processes for the user 112 or client devices 108 of the user. Such authentication processes may be performed to secure various types of assets (e.g., computing assets, website access, account access, physical access, etc.). The authentication server 116 may have access to and maintain a user authentication data set that is stored in a user authentication database 152. The user authentication database 152 may store data, authentication rules, and/or templates that can be used by the authentication server 116 to authenticate one or multiple users 112. As a non-limiting example, the user authentication database 152 may be used to store biometric templates for one or multiple users 112 and the information included in the biometric templates can be used to verify an identity or authenticate a user 112 based on images captured by their client device 108, as will be described in further detail herein. The user authentication database 152 may be provided as an extensible or non-extensible database. Specifically, the user authentication database 152 may take on any form of known or yet-to-be developed database structures (e.g., graph database, hierarchical database, relational database, object-oriented database, network database, etc.)

The authentication server 116 is shown to include a processor 120 and memory 124 in addition to the network interface 128. These resources may enable functionality of the authentication server 116 as will be described herein. For instance, the network interface 128 provides the server 116 with the ability to send and receive communication packets over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 120 may be provided as a microprocessor, Central Processing Unit (CPU), or plurality of microprocessors or CPUs that are configured to execute the instruction sets stored in memory 124. Upon executing the instruction sets stored in memory 124, the processor 120 enables various authentication functions of the authentication server 116.

The memory 124 may include any type of computer memory device or collection of computer memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data into the user authentication database 152 and retrieve information from the user authentication database 152. Alternatively or additionally, the user authentication database 152 or data stored therein may be stored internal to the server 116 (e.g., within the memory 124 of the server 116 rather than in a separate database).

The illustrative instruction sets that may be stored in memory 124 include, without limitation, facial recognition instructions 132, One Time Password (OTP) instructions 136, gaze tracking instructions 140, optical code analysis instructions 144, and challenge/response instructions 148. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

Figure 2:
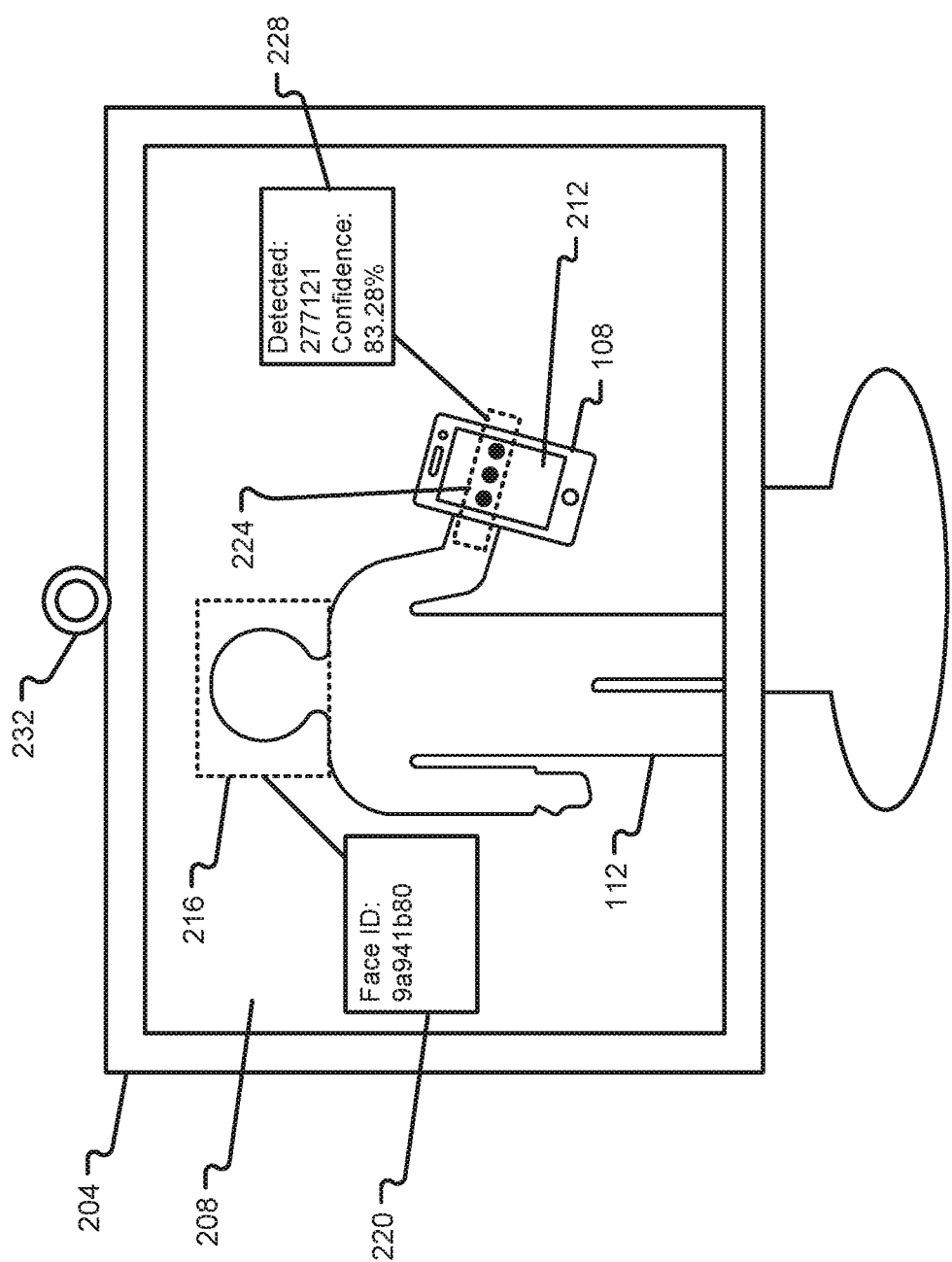
FIG. 2 depicts a user interface used for a first authentication method in accordance with at least some embodiments of the present disclosure.
Figure 3:
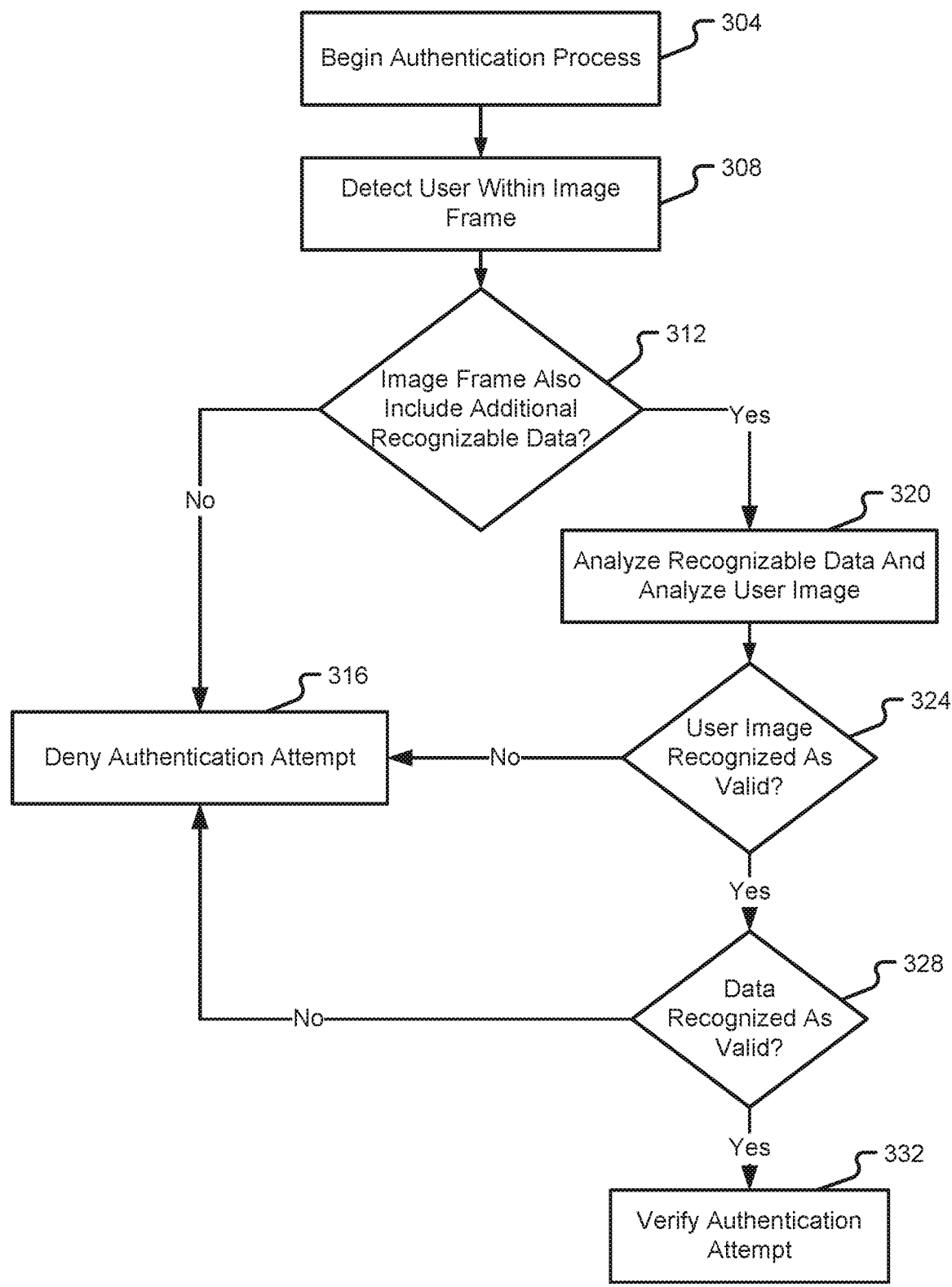
FIG. 3 is a flow chart depicting a first authentication method in accordance with at least some embodiments of the present disclosure.

With reference now to FIGS. 2 and 3, a first authentication process will be described in accordance with at least some embodiments of the present disclosure. This particular authentication process may be enabled by the server 116 executing facial recognition instructions 132, OTP instructions 136, optical code analysis instructions 144, and/or challenge/response instructions 148. Although the process will be described in connection with authenticating a single user 112, it should be appreciated that the process can be used to authenticate one or multiple users at the same time without departing from the scope of the present disclosure.

The first authentication process may be initiated when a user 112 requests access to one or more assets that are otherwise protected by the authentication server 116 and require the user 112 to prove his/her identity prior to allowing access to the one or more assets (step 304). In some embodiments, the process may be initiated by the user 112 simply attempting to access a protected asset via their client device 108 and the user 112 may be redirected or prompted by the authentication server 116 to perform the authentication process. As a non-limiting example, the user 112 may be attempting to access the asset using their client device 108. FIG. 2 depicts two examples of a user's 112 client device 108. Specifically, FIG. 2 shows the user 112 as sitting in front of a computational device 204, such as a personal computer or laptop computer, and holding a mobile client device 108. The mobile client device 108 is referred to as a client device whereas the computational device 204 is not referred to as a client device simply to avoid confusion (e.g., so as not to use the same term for different devices in this discussion). It should be appreciated, however, that both the computational device 204 and mobile communication device 108 can be referred to as a first and second different type of client device 108 that are used by the user 112. In some embodiments, the user 112 may have attempted to access a protected asset by their computational device 204 or by their mobile client device 108.

The computational device 204, in some embodiments, may be provided as a second mobile client device. Specifically, any type of device that is configured to capture an image of the user 112 and communicate that information to the authentication server 116 can be used as the computational device 204. The computational device 204 is depicted to include a user interface 208 that at least includes a display screen. The computational device 204 may also include an image-capture device 232 (e.g., camera, video camera, etc.) that is configured to capture one or more images of the user 112 and the user's 112 mobile client device 108.

An image of the user 112 may be captured by an image sensor 232 after the authentication process is initiated and the image may be sent from the computational device 204 to the authentication server 116 via the communication network 104. The image-capture device 232 may correspond to any type of image-capturing device configured to capture video images and/or still images 112 of the user 112 when the user 112 is positioned in front of the computational device 204. The authentication server 116 may utilize the facial recognition instructions 132 to automatically identify pixels of interest with the one or more images received from the computational device 204. In some embodiments, the facial recognition instructions 132 may be used to detect a user 112 within the image frame (step 308). In a more specific embodiment, the facial recognition instructions 132 may be used to identify a first region of interest 216 within the image frame, where the first region of interest 216 includes pixels that make up the user's 112 facial image. The facial recognition instructions 132 may be configured to simply identify that pixels in the image frame include an image of a human face or some other part of user 112 to be submitted to a recognition process (e.g., fingerprint, ear lobe, etc.). At this point, the facial recognition instructions 132 may not actually be invoked to begin analyzing the user's 112 features within the first region 216 as the image frame may be further searched for additional recognizable data (step 312).

In some embodiments, when the first region of interest 216 is identified, the process continues with the authentication server 116 further searching the image frame for other recognizable data. The other recognizable data may be in the form of a OTP (e.g., in plain text, encrypted text, hashed text, optical code, linear barcode, matrix (2D) barcodes such as a QR code, etc.) being displayed on a display screen 212 of the mobile client device 108. If this additional recognizable data is detected, then the authentication server 116 may identify a second region of interest 224 within the image frame and the query of step 312 may be answered affirmatively. If no additional recognizable data is detected, then the query of step 312 may be answered negatively. In some embodiments, it may be desirable to perform the additional search of the image frame for recognizable data prior to performing the biometric analysis of the user's 112 image in the first region of interest 216. Specifically, searching for the additional recognizable data beforehand can possibly avoid the unnecessary use of processing resources for biometric analysis if the second region of interest 224 is not identified.

In some embodiments, the authentication server 116 may utilize image processing instructions to search the image frame for data having a predetermined or defined format. For instance, the authentication process may require that the user 112 pass a facial recognition challenge in addition to presenting a valid OTP on their mobile client device 108. Failure to pass both challenges may result in a denial of the authentication attempt (step 316). In some embodiments, the OTP required to be presented by the mobile client device 108 may have a defined and predictable format (e.g., a defined number of characters, a defined starting or ending symbol, a QR code format, a barcode format, etc.). If the image processing instructions of the authentication server 116 do not recognize any additional data within the image frame, then the authentication server 116 can simply make the decision that the user 112 has not presented the necessary information to complete the authentication process and access to the protected asset may be denied.

The additional data may also correspond to data representing the type of device providing the OTP. As a non-limiting example, the authentication server 116 may be configured to analyze an image of the mobile client device 108 to determine a type of the mobile client device (e.g., iPhone, Samsung, keychain OTP, etc.). The authentication server 116 may further be configured to confirm that the device type matches the OTP device enrolled by a user or administrator of the system 100.

However, if the image frame is determined to have additional recognizable data, perhaps in the form of a OTP, QR code, barcode, etc., presented on the mobile client device 108, then the authentication server 116 may continue the authentication process by analyzing the recognizable data within the second region of interest 224 in the image (step 320). The analysis of the recognizable data may be performed before, after, or in parallel with the analysis of the user's 112 image from the first region of interest 216. For example, if the analysis of both the recognizable data and user image can be performed relatively quickly in parallel, it may be desirable to do so, thereby minimizing the amount of time required for the user 112 to endure the authentication process (e.g., to increase usability of the system). In other embodiments, if the analysis of one type of data takes more time as compared to the other, it may be desirable to analyze the type of data that requires less time so that a first decision on validity of that data can be made before committing processing resources to analyzing the second type of data. As a non-limiting example, it may be desirable to first analyze the recognizable data prior to analyzing the user image if biometric authentication takes longer than analysis of a QR code or string of alphanumeric characters.

In some embodiments, both the first region of interest 216 and second region of interest 224 may be analyzed in an attempt to obtain information about the user's image 220 and information about the OTP 228, respectively. In the illustrative embodiment, the first region of interest 216 may include an image of the user's 112 face, in which case the image recognition instructions 132 will be used to try and identify the user 112 based on their facial image. This facial recognition step may be performed by identifying features of the user 112 within the first region of interest 216 and converting those features to a template or set of data. The template or set of data may be compared to templates or data sets within the user authentication database 152 to see if the user can be found as a known user within the database 152. As a non-limiting example, the facial recognition instructions 124 may identify the user's 112 biometric information in the database 152 and determine that the biometric information corresponds to the user 112, perhaps with a particular confidence score. It should be appreciated that any type of biometric analysis can be performed to try and identify the user 112 as a known and enrolled user of the authentication system. If the user's image is recognized, at least within a predefined confidence tolerance, then the user image can be recognized as valid (step 324). If the user's image is not recognized from data within the database 152, then the authentication attempt may be denied (step 316). Recognizing the user based on an analysis of the first region of interest, which may include an image of the user's face or other biometric information, allows the user to avoid physically entering or keying in user identification information, such as a username or email in order to identify the user, which protects against key logger attacks (e.g., recording (logging) of the keys struck on a keyboard by a user, typically covertly).

Assuming the user's 112 image is recognized as valid, then the authentication server 116 may further analyze the additional recognizable data from the second region of interest 224 to determine if the data included therein is also valid (step 328). In particular, the authentication server 116, upon initiating the authentication process, may have generated an OTP using its OTP instructions 136 and transmitted that OTP to the mobile client device 108. When the user 112 received the OTP at their mobile client device 108, the user 112 may further have been prompted to present the OTP, via the mobile client device 108, to a camera 232 of the computing device 204, thereby causing the OTP to be presented within the same image frame as the image of the user 112. Because the authentication server 116 issued the OTP at the onset of the authentication process, the authentication server 116 has knowledge of the OTP that should be presented by the user 112. Failure of the user 112 to present the valid OTP within a predetermined amount of time may result in a denial of the authentication attempt (step 316). In some embodiments, the authentication server 116 may be configured to determine a confidence score for a recognition of the additional recognizable data from the image. The confidence score may reflect a confidence in optical-character recognition results, for instance. If the confidence score is below a predetermined minimum threshold score, then the user 112 may be required to adjust a presentation of the mobile client device 108 to try and obtain a better recognition of the additional recognizable data. For instance, the user 112 may be asked to move the device 108 closer to or further away from the camera 232, adjust a lighting around the camera 232, or the like. However, if a valid OTP (e.g., code 277121 in the example scenario of FIGS. 2 and 3) is detected within the second region of interest 224 and the authentication server 116 is able to detect the valid OTP with at least a predetermined confidence level, then the authentication server 116 may determine that the data presented in the second region of interest 224 is also valid.

Alternatively or additionally, the OTP could be generated by the mobile device 108 in the user's hand. That is, the mobile device 108 could have an enrolled OTP application generating OTPs on a time or event-driven basis. The authentication server 116 may likewise have the seed value for the OTP, and the authentication server 116 could be configured to confirm that the OTP generated by the mobile device 108 is correct. In this manner, the mobile device 108 in the user's 112 hand need not have internet access. In yet another arrangement, the user 112 could simply hold an OTP keychain token or other like token in his/her hand and use that device instead of a mobile device 108 such that the OTP keychain token or other like token is presented by the user 112 to the camera 232 of the computing device 204.

In response to determining that both the user 112 image corresponds to a valid/enrolled user and the additional data corresponds to a valid OTP (e.g., at least within a predetermined confidence level), then the authentication server 116 may verify the authentication attempt and enable the user 112 to access the protected asset (step 332). The verification of the authentication attempt may be completed by sending a message to the user 112 indicating a successful authentication has occurred or the user 112 may simply be given access to the protected asset via their computing device 204 and/or mobile client device 108. It should be appreciated that in addition to utilizing the facial recognition instructions 132 and OTP instructions 136 as part of performing the authentication process, the authentication server 116 may also utilize its optical code analysis instructions 144 to analyze the OTP within the second region of interest 224. The authentication server 116 may also utilize the challenge/response instructions 148 as part of sending the OTP generated by the OTP instructions 136 to the mobile client device 108 and recognizing that the OTP presented within the image frame corresponds to a valid OTP that was previously transmitted by the authentication server 116.

In the above described embodiments, the additional recognizable data can beneficially act as protection against presentation attacks by unauthorized users. That is, the additional recognizable data can protect against cases where unauthorized users spoof biometric features of the user in the first region of interest 216 in order to gain unauthorized access. Use of the additional recognizable data also permits the use of less sophisticated, less computationally complex, and/or less processor-intensive biometric or facial recognition systems and/or methods for detecting and validating images or information presented in the first region of interest 216. For example, simple, easily available, and/or relatively lower cost cameras, such as commercially available webcams or cameras commercially used on typical mobile phones or other common mobile devices, may be used for biometric authentication or facial recognition. Additionally, use of the additional recognizable data allows for an easier and/or less onerous or burdensome user biometric or facial recognition experience. For example, the user may not need to be required to be substantially still during biometric or facial recognition and/or the user may not need to be required or requested to make certain movements, such as certain head or eye movements or blinks, in order to confirm the system is not being spoofed.

Figure 4:
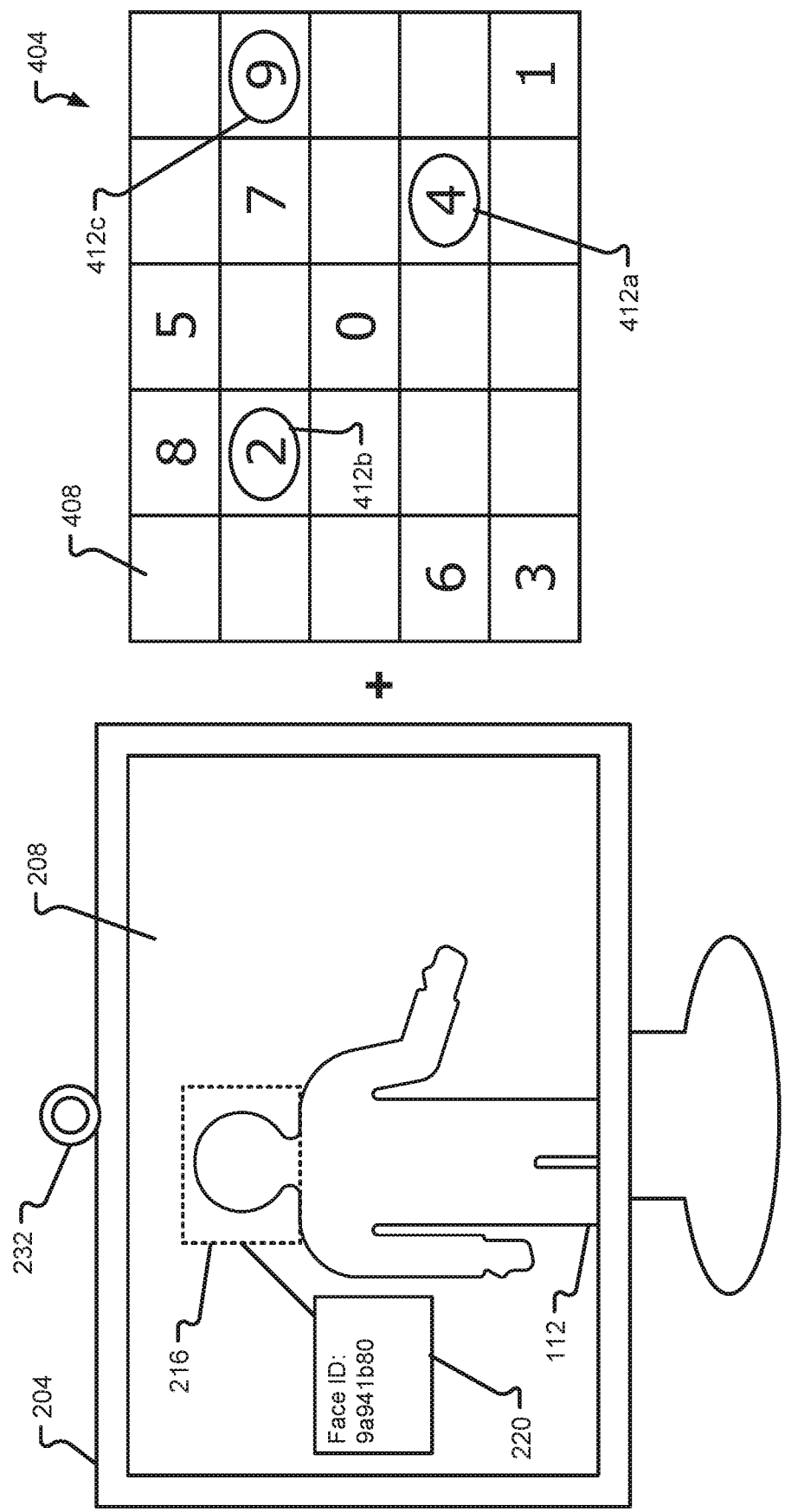
FIG. 4 depicts a user interface used for a second authentication method in accordance with at least some embodiments of the present disclosure.
Figure 5A:
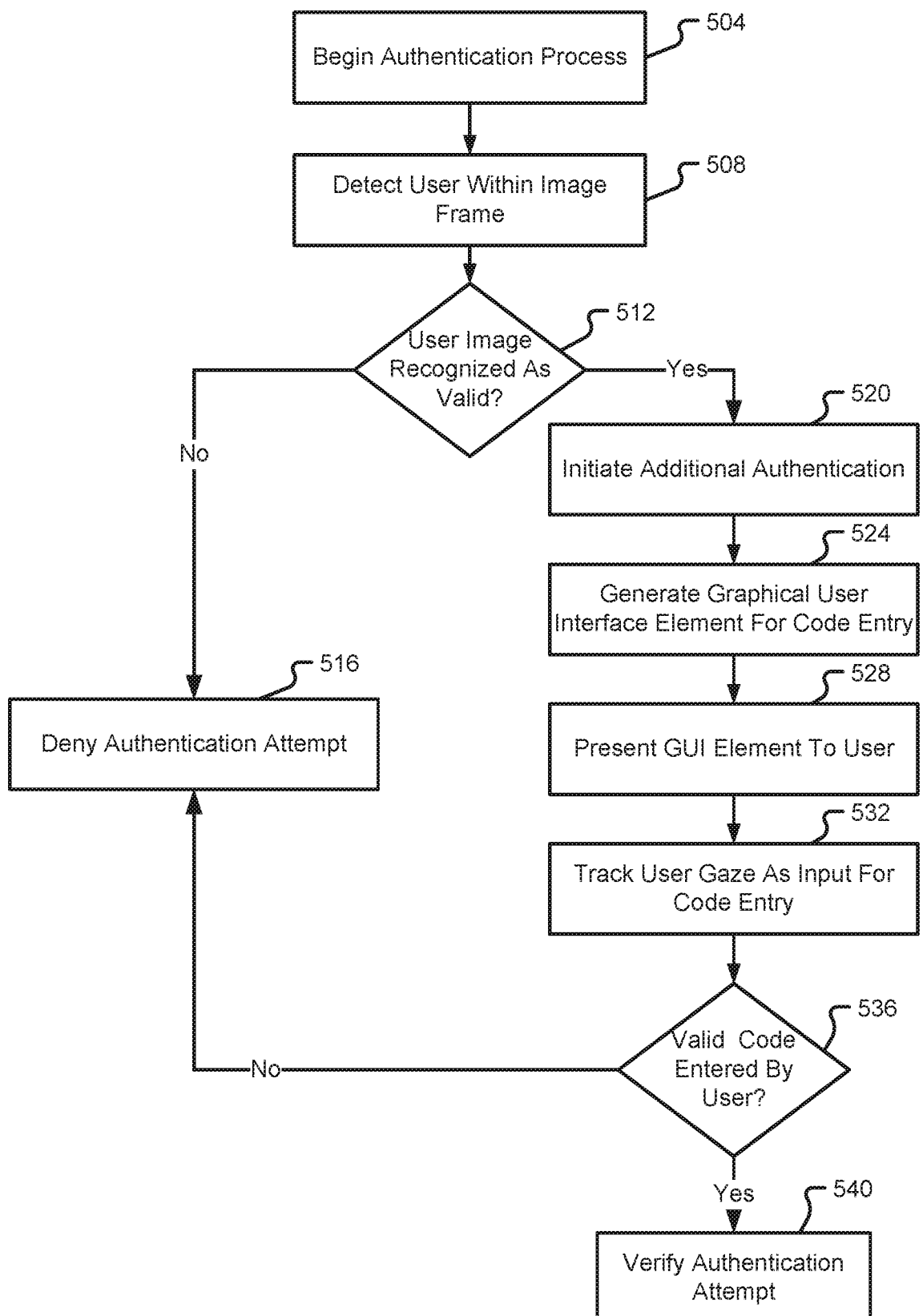
FIG. 5A is a flow chart depicting one example of a second authentication method in accordance with at least some embodiments of the present disclosure.
Figure 5B:
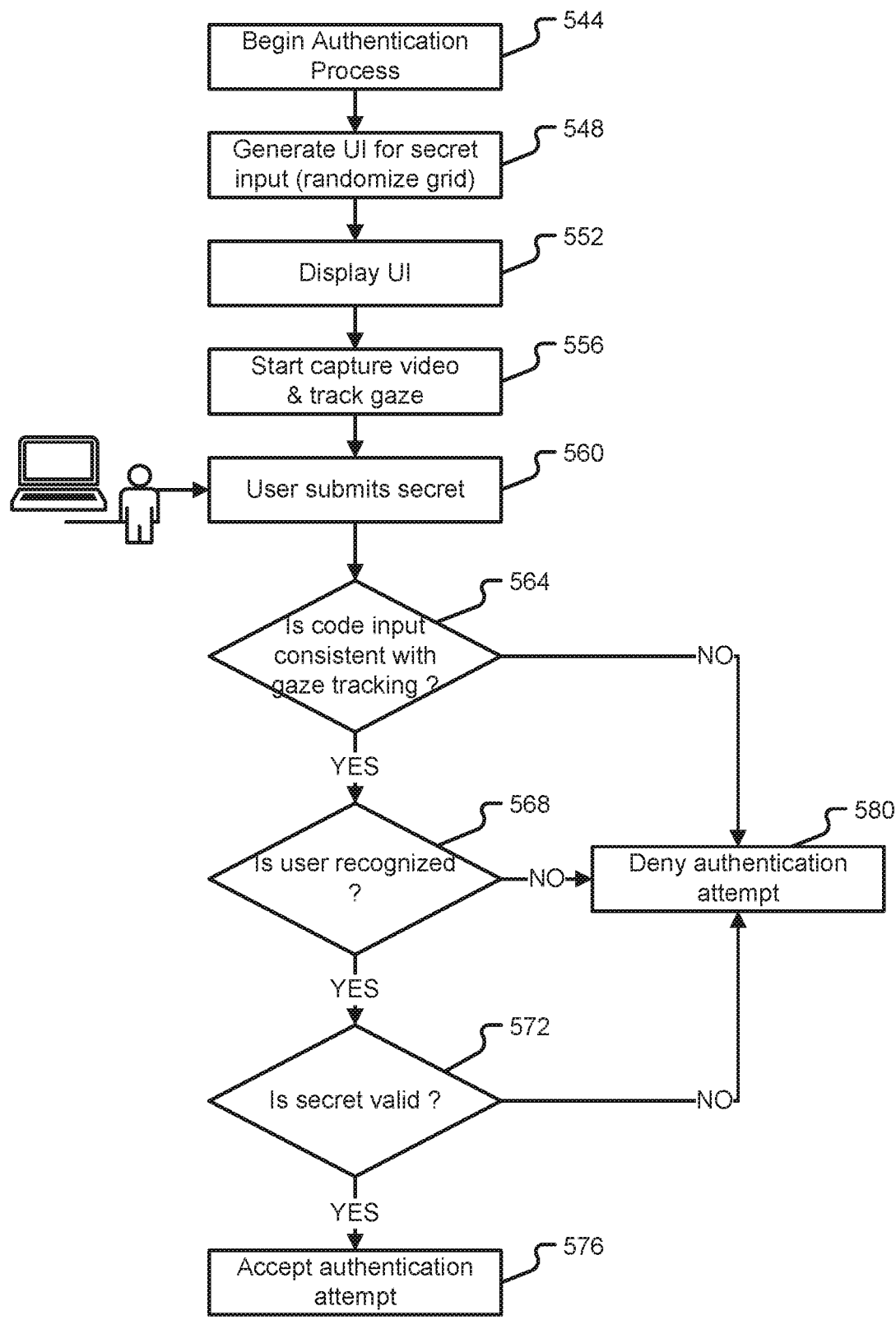
FIG. 5B is a flow chart depicting another example of a second authentication method in accordance with at least some embodiments of the present disclosure.

With reference now to FIGS. 4, 5A, and 5B, a second authentication process will be described in accordance with at least some embodiments of the present disclosure. This particular authentication process may be enabled by the server 116 executing facial recognition instructions 132, OTP instructions 136, gaze tracking instructions 140, optical code analysis instructions 144, and/or challenge/response instructions 148. Although the process will be described in connection with authenticating a single user 112, it should be appreciated that the process can be used to authenticate one or multiple users at the same time without departing from the scope of the present disclosure.

Referring initially to FIG. 5A, the process begins at step 504 and continues by detecting a user 112 within an image frame (step 508). Similar to step 304, the second authentication process may be initiated by user 112 requesting access to a protected asset or being presented with information by the authentication server 116. After the process is initiated, the user's 112 image may be obtained with a camera 232 of a computing device 204 and/or with a camera of the user's mobile client device 108. Furthermore, although FIG. 4 depicts the user's 112 image as being presented on the user interface 208 of the computing device 204, it should be appreciated that the user's 112 image may be presented on a user interface of the mobile client device 108 without departing from the scope of the present disclosure. The image may correspond to one or more still images or to a video image of the user 112. In other words, the image may correspond to a single image captured as a picture or to a plurality of images captured as video.

The process continues with the facial recognition instructions 132 analyzing the one or more images to determine if the user's 112 image corresponds to a recognized/authorized user within the user authentication database 152 (step 512). Facial recognition instructions 132 or facial recognition, in general, may include or be performed using any known or yet-to-be developed facial recognition instructions, methods, systems, or techniques. If this query is answered negatively, then the server 116 may attempt further analysis of the image or simply deny the authentication attempt (step 516). If, however, the user's image is recognized as valid, then the process may continue with the server 116 initiating an additional authentication challenge/response protocol (step 520). In particular, the challenge/response instructions 148 in cooperation with the gaze tracking instructions 140 may generate one or more Graphical User Interface (GUI) elements 404 for presentation to the user 112 (step 524). In some embodiments, the GUI element(s) 404 may be presented to the user 112 via the user interface 208 of the computing device 204 (step 528). Alternatively or additionally, the GUI element(s) 404 may be presented to the user 112 via a user interface of the mobile client device 108.

In some embodiments, the GUI element(s) 404 may correspond to a data entry grid comprising a plurality of predefined areas 408. One or more of the predefined areas 408 may have no populated data whereas other predefined areas 408 may have data populated therein. It should be appreciated that the layout or population of the predefined areas 408 with data (e.g., symbols, characters, alphanumeric values, etc.) may dynamically change every time a different GUI element 404 is generated or each GUI element for a particular user 112 may have the same predefined areas 408 populated with the same data. In some embodiments, the data populating the predefined areas 408 may correspond to data that is useable by the user 112 to enter an access code that is known by the user. In this way, the challenge/response instructions 148 are challenging a knowledge of the user 112 in addition to already proving that the user 112 corresponds to a trusted/known user. The layout of data within the predefined areas 408 may be kept the same from one authentication attempt to the next to facilitate ease of use whereas the layout of data to different predefined areas 408 from one authentication attempt to the next may be used to increase system security.

Upon being presented with the GUI element(s) 404, the user 112 may input their code or PIN. In some embodiments, a user 112 may input their code or PIN by clicking or touching with the finger the squares/areas 408 having the appropriate digits of the code/PIN. In some embodiments, the gaze tracking instructions 140 may be configured to track, via the video feed, the user's 112 gaze simultaneously with the user's 112 entry of their code or PIN. If the gaze tracking instructions 140 acknowledge that the user's 112 gaze is matching the finger or mouse input (e.g., the user 112 is looking at the predefined area 408 where the manual input is being received), then the entry of the code or PIN may be determined to be valid and not some replay attack.

Alternatively, the user 112 may input their code or PIN by moving their eyes or gaze from one predefined area 408 to the next. In some embodiments, the user 112 may be prompted, by the server 116, to enter their code or PIN by staring/gazing at their code in a sequential fashion. As the user 112 gazes from one data element to the next, the gaze tracking instructions 140 may be configured to detect which of the predefined areas 408 the user 112 is gazing at (step 532). The detection of the gaze may be performed alone or in connection with also receiving a manual input from the user 112 via the user's finger or a mouse input. If the user 112 gazes at the appropriate predefined areas 408 in the appropriate order and simultaneous with the entry of the code or PIN, then the gaze tracking instructions 140 may determine that the user 112 has entered a valid code (step 536). If the user 112 is not determined to have entered a valid code or has failed to gaze at the appropriate areas 408 when entering the code/PIN, then the authentication attempt may be denied (step 516). However, if the user 112 is determined to have entered a valid code by gazing at their predefined code in the appropriate order, then the server 116 may verify the authentication attempt (step 540).

In some embodiments, the user 112 may be allowed to enter their PIN, password, code, or the like by moving their gaze from one predefined area 408 to a next predefined area 408 in a particular order. In the example of FIG. 4, the user's 112 PIN/password/code may correspond to "429", which requires the user 112 to first gaze at the predefined area 408 having the first data 412a for the first symbol of the PIN/password/code, then gaze at the predefined area 408 having the second data 412b for the second symbol of the PIN/password/code, then gaze at the predefined area 408 having the third data 412c for the third symbol of the PIN/password/code. If the user 112 gazes as the wrong data or predefined area 408 or gazes at the data in the wrong order, then the user's 112 authentication attempt may be denied.

As mentioned above, the position of data in the predefined areas 408 may be randomized, perhaps with the assistance of a random number generator or similar circuitry. This means that each time the GUI element 404 is generated, even if generated for the same user 112, the GUI element 404 will appear different from one iteration to the next. While the GUI element 404 is being presented, in some embodiments, the facial recognition instructions 132 may be configured to identify the user 112. Said another way, the user 112 may be allowed to enter their PIN/password/code while their facial image is being analyzed by the server 116. This effectively removes the need of requiring the user 112 to input a user ID, such as an email address or the like. As mentioned above, avoiding the physical entry or keying in of user identification information, such as a username or email in order to identify the user, protects against key logger attacks. Using gaze tracking in combination with facial recognition helps ensure that the video feed is actually a live and genuine video feed, rather than a replay of a previously-captured video feed.

In some embodiments, the gaze tracking instructions 140 enforce that the code input and the eye-movements are consistent, making sure that the video feed inputted to facial recognition instructions 124 is actually the user 112 entering his/her PIN/password/code. Alternatively or additionally, it may be possible to further increase the security of the GUI element(s) 404 by utilizing OTPs or seeded PINs (e.g., with assistance of the OTP instructions 136). In this way, the data presented within the predefined areas 408 can be further protected from replay attacks and other known types of authentication attacks. Yet another possible alternative to using a PIN is to utilize a security number or last 4 digits printed on a credit card that has been previously issued to the user 112.

Referring now to FIG. 5B, an alternative authentication process to that depicted in FIG. 5A will be described in accordance with at least some embodiments of the present disclosure. It should be appreciated that any of the process steps depicted in FIG. 5B may be used in lieu of or as an addition to the process steps depicted in FIG. 5A. As with the previous method, the authentication process begins (step 544) and continues by generating a UI for a secret input at a display of a computing device 204 (step 548).

The method continues by rendering the UI (step 552) and then starting an image capture process whereby a video feed of the user 112 is captured with an image-capture device 232 (step 556). During this image capture process a gaze of the user 112 may be tracked with respect to the display. As the user's gaze is tracked, the user 112 may begin to enter or submit the secret input by moving their gaze in an appropriate fashion (step 560).

The method will continue by determining if the secret input is consistent with or matches the code input by the gaze tracking (step 564). If so, then the process may also determine if the user that was subjected to the gaze tracking is also a recognized user (step 568). If so, then the process may also determine if the secret entered by the user 112 is a valid secret (step 572). As long as all three queries of steps 564, 568, and 572 are answered affirmatively, the method will continue by accepting the user's authentication attempt (step 576). If any of the queries are answered negatively, then the authentication attempt may be denied (step 580). It should be appreciated that the queries and analyses associated therewith performed at steps 564, 568, 572 may be performed in any sequence or may be performed in parallel without departing from the scope of the present disclosure.

An example benefit of some or all of the above described embodiments utilizing GUI elements 404 for presentation to the user 112 via a user interface, such as user interface 208, is that such embodiments do not require the user possess a particular device, or even a device at all. For example, the user interface could be provided on any suitable device, such as a standalone computing device, a kiosk, or an automated teller machine (ATM).

Figure 6B:
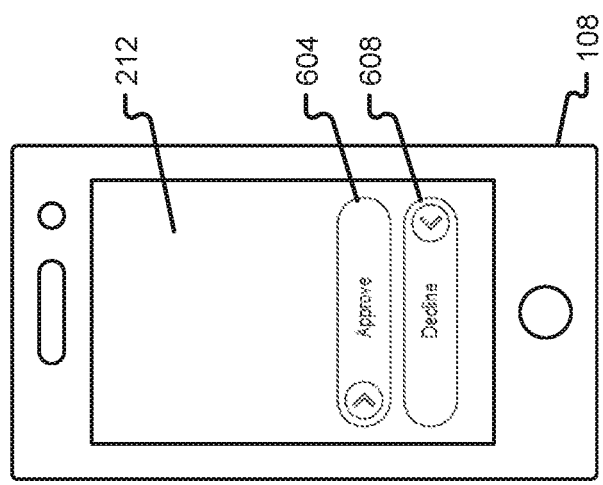
FIG. 6B depicts another user interface used for the third authentication method in accordance with at least some embodiments of the present disclosure.
Figure 6A:
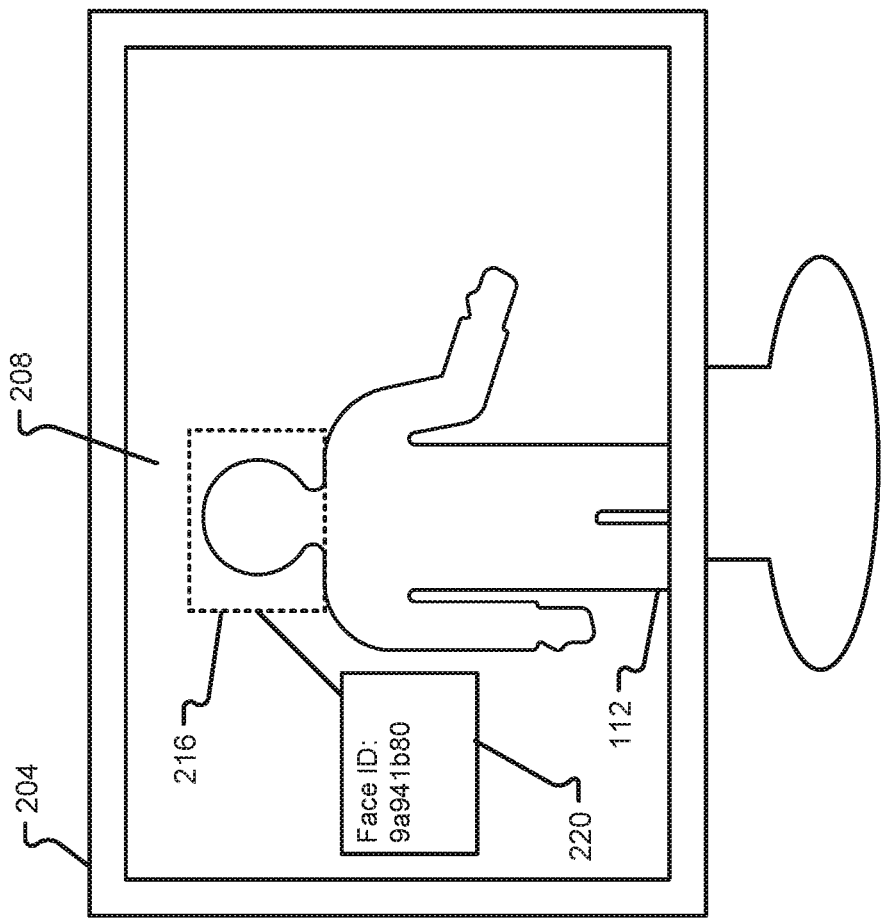
FIG. 6A depicts a user interface used for a third authentication method in accordance with at least some embodiments of the present disclosure.
Figure 7:
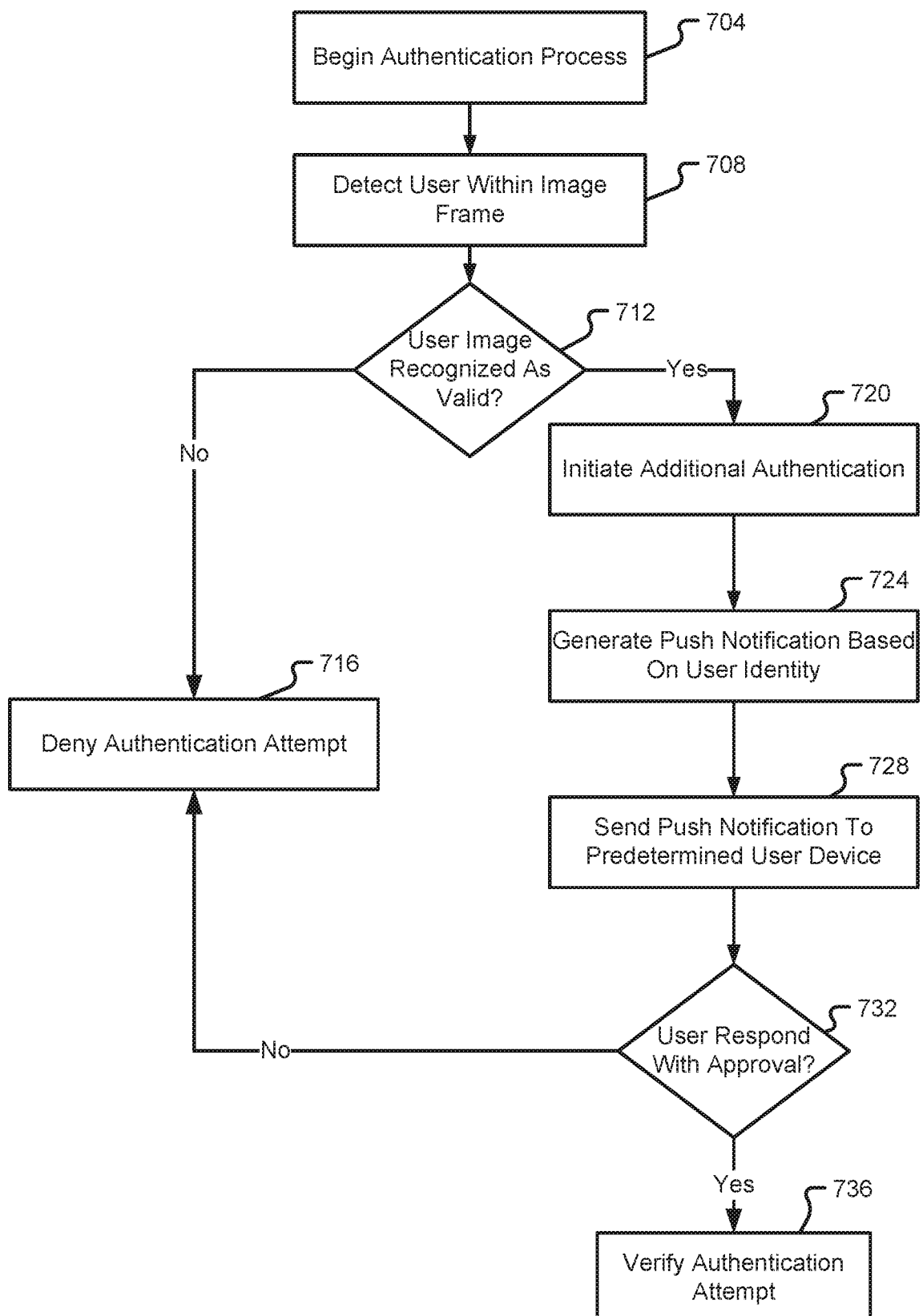
FIG. 7 is a flow chart depicting a third authentication method in accordance with at least some embodiments of the present disclosure.

With reference now to FIGS. 6A, 6B, and 7, another authentication process will be described in accordance with at least some embodiments of the present disclosure. This particular authentication process may be enabled by the server 116 executing facial recognition instructions 132 and/or challenge/response instructions 148. Although the process will be described in connection with authenticating a single user 112, it should be appreciated that the process can be used to authenticate one or multiple users at the same time without departing from the scope of the present disclosure.

The process begins at step 704 and continues by detecting a user 112 within an image frame (step 708). Similar to step 504, this authentication process may be initiated by user 112 requesting access to a protected asset or being presented with information by the authentication server 116. After the process is initiated, the user's 112 image may be obtained with a camera of a computing device 204 and/or with a camera of the user's mobile client device 108. In some embodiments, the authentication process may be initiated by the user 112 at their computing device 204 or some device other than their mobile client device 108. The image of the user 112, however, can be captured with either the computing device 208 or the mobile client device 108.

The process continues with the facial recognition instructions 132 analyzing the one or more images to determine if the user's 112 image corresponds to a recognized/authorized user within the user authentication database 152 (step 712). This particular step may be similar to step 512 of FIG. 5. If the user's 112 image is not recognized with reference to the user authentication database 152, the authentication attempt may be denied (step 716). If the user's 112 image is recognized and the query of step 712 is answered affirmatively, then the process may continue with the server 116 initiating an additional authentication of the user 112 (step 720). As mentioned above, recognizing the user based on an analysis of the user's image allows the user to avoid physically entering or keying in user identification information, such as a username or email in order to identify the user, which protects against key logger attacks.

In some embodiments, the server 116 may utilize the challenge/response instructions 148 to generate a push notification that is based on the determined identity of the user 112 (step 724). In other words, when the facial recognition process is completed, the user's 112 information may be obtained from the user authentication database 152. The user's 112 information may include an address for the user's 112 mobile client device 108.

The authentication server 116 may be configured to automatically send the push notification to the user's 112 mobile client device 108 based on information obtained for the user 112 from the user authentication database 152 (step 728). An automated addressing of the push notification helps to ensure that the user 112 requesting the authentication is still within possession of their mobile client device 108. Specifically, the push notification may be sent to the mobile client device 108 with a requirement that the user 112 respond with an approve or deny input (step 732). If the user 112 responds on their mobile client device 108 by selecting/swiping an approve input 604, then the process may continue with the server 116 verifying the authentication attempt and allowing the user 113 access to the protected asset (step 736). In the depicted embodiment, the user 112 verifies the desire to authenticate on a device 108 that was previously associated with the user 112. Furthermore, because the authentication process relies on some type of biometric recognition of the user 112, then automates the push notification and approval request process, the user's 112 experience is improved as compared to requiring the user 112 to type in a password or PIN. The biometric recognition combined with the push notification also helps defeat key logger attacks and similar types of system attacks. There is also an opportunity for the user 112 to decline the authentication attempt by selecting/swiping a decline input 608 on the mobile client device 108. If the user 112 selects the decline input 608, then the authentication attempt may be denied (step 716). In some embodiments, the facial recognition may be used for simply identifying the appropriate client device 108 to receive the push notification rather than performing the more processor-intensive biometric recognition. While such an embodiment may not be as secure (e.g., due to not performing biometric template matching or a similar biometric authentication), there is still some security provided by using the association between user and device and still requiring a valid user input at the client device 108. This particular embodiment may, however, vastly improve the user experience because such a process can be performed relatively quickly.

With reference now to FIG. 8, another authentication process will be described in accordance with at least some embodiments of the present disclosure. This particular authentication process may be enabled by the server 116 executing OTP instructions 136, optical code analysis instructions 144, and/or challenge/response instructions 148. Although the process will be described in connection with authenticating a single user 112, it should be appreciated that the process can be used to authenticate one or multiple users at the same time without departing from the scope of the present disclosure.

The process begins with a user 112 initiating authentication, for example by attempting to access an asset that is protected by the authentication server 116. In some embodiments, the user 112 may initiate the process by transmitting a client request from a first client device 204 to the server 116 (step S801). In some embodiments, the first client device 204 may correspond to a computing device 204 or any other type of computing device, that may or may not necessarily be solely operated by the user 112.

Upon receiving the request for authentication, the server 116 may invoke the OTP instructions 136 and/or challenge/response instructions 148 to generate an authentication challenge for the user (step S802). In some embodiments, the generation of an authentication challenge may be encoded within an optical code, such as a barcode, QR code, or the like. In some embodiments, the challenge may be signed by the server 116 to enable a trust verification between the server 116 and the eventual recipient of the challenge. As a specific but non-limiting example, the challenge may correspond to a signed JSON Web Token (JWT) that is encoded inside a QR code.

The process continues with the server 116 transmitting the challenge to the client device 204 that initially transmitted the authentication request (step S803). In some embodiments, the challenge may be transmitted to the client device 204 using a secure web-communication protocol (e.g., HTTPS). Upon receiving the challenge, the client device 204 may be configured to render or display the challenge via a user interface (step S804). In some embodiments, the challenge is displayed as a QR code 804 or similar type of optical code.

Thereafter, an interaction may occur between the client device 204 and another client device, such as the mobile client device 108 (step S805). In some embodiments, the mobile client device 108 may utilize one or more image sensors to scan the QR code 804 being displayed by the first client device 204. When the mobile client device 108 scans the QR code 804, the mobile client device 108 may utilize an application stored thereon (e.g., instructions local to the mobile client device 108) to generate an appropriate user request for presentation to the user 112 of the mobile client device 108 (step S806). An example benefit of using an optical code, such as a barcode, QR code, or the like, is that reading and analyzing such optical codes can be relatively easily integrated in the application stored on the mobile client device, and such optical codes provide consistency in the authentication process. Morever, the user has a more seamless experience without requiring the input of any secrets or passwords into the application. In some embodiments, the mobile client device 108 may further analyze the signature of the challenge to ensure that the challenge was issued by a trusted server 116 prior to displaying a prompt to the user 112. If the signature of the challenge is verified, then the user 112 may be provided with a prompt to accept or deny the authentication request (similar to the user interface depicted in FIG. 6B). In some embodiments, if the user 112 accepts the authentication request by appropriately selecting an accept input on the mobile client device 108, the process continues with the mobile client device 108 transmitting a signed response to the server 116 (step S807). In some embodiments, the response generated by the mobile client device 108 may include an identification number uniquely associated with the user 112 and may be signed with a user-specific private key. The server 116 may respond by allowing the user 112 access to the protected asset (e.g., either via the client device 204 or mobile client device 108). An additional and possibly optional step may involve the server 116 transmitting a notification to the first client device 204 that indicates results of the authentication process (step S808). For instance, if the server 116 received a validly-signed response and was able to decrypt the response with its public key, then the server 116 may verify the authentication attempt and notify the user 112 of the same via the client device 204 or via the mobile client device 108.

Although the process depicted in FIG. 8 does not show the server 116 performing a biometric analysis of the user 112 (e.g., facial recognition, fingerprint analysis, etc.), embodiments of the present disclosure contemplate that the process may be supplemented with a biometric analysis step. For instance, prior to allowing the mobile client device 108 to sign and encrypt the response at step S806, the user 112 may be required to perform a biometric authentication either with the mobile client device 108 or with the server 116 as described in connection with other authentication processes herein.

Figure 9B:
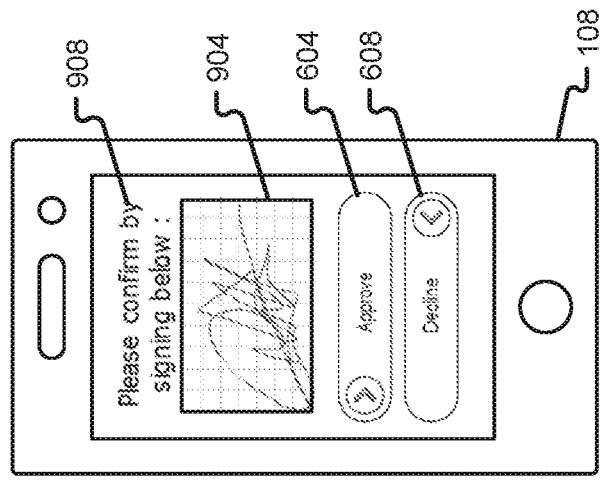
FIG. 9B depicts a second user interface in a series of user interfaces used in a fifth authentication method in accordance with at least some embodiments of the present disclosure.
Figure 9A:
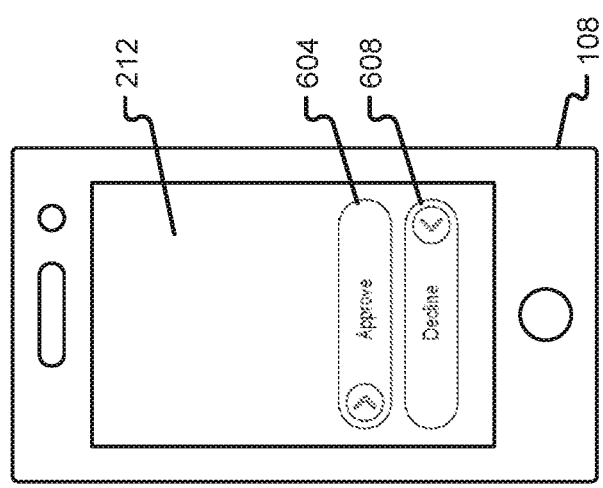
FIG. 9A depicts a first user interface in a series of user interfaces used in a fifth authentication method in accordance with at least some embodiments of the present disclosure.
Figure 10:
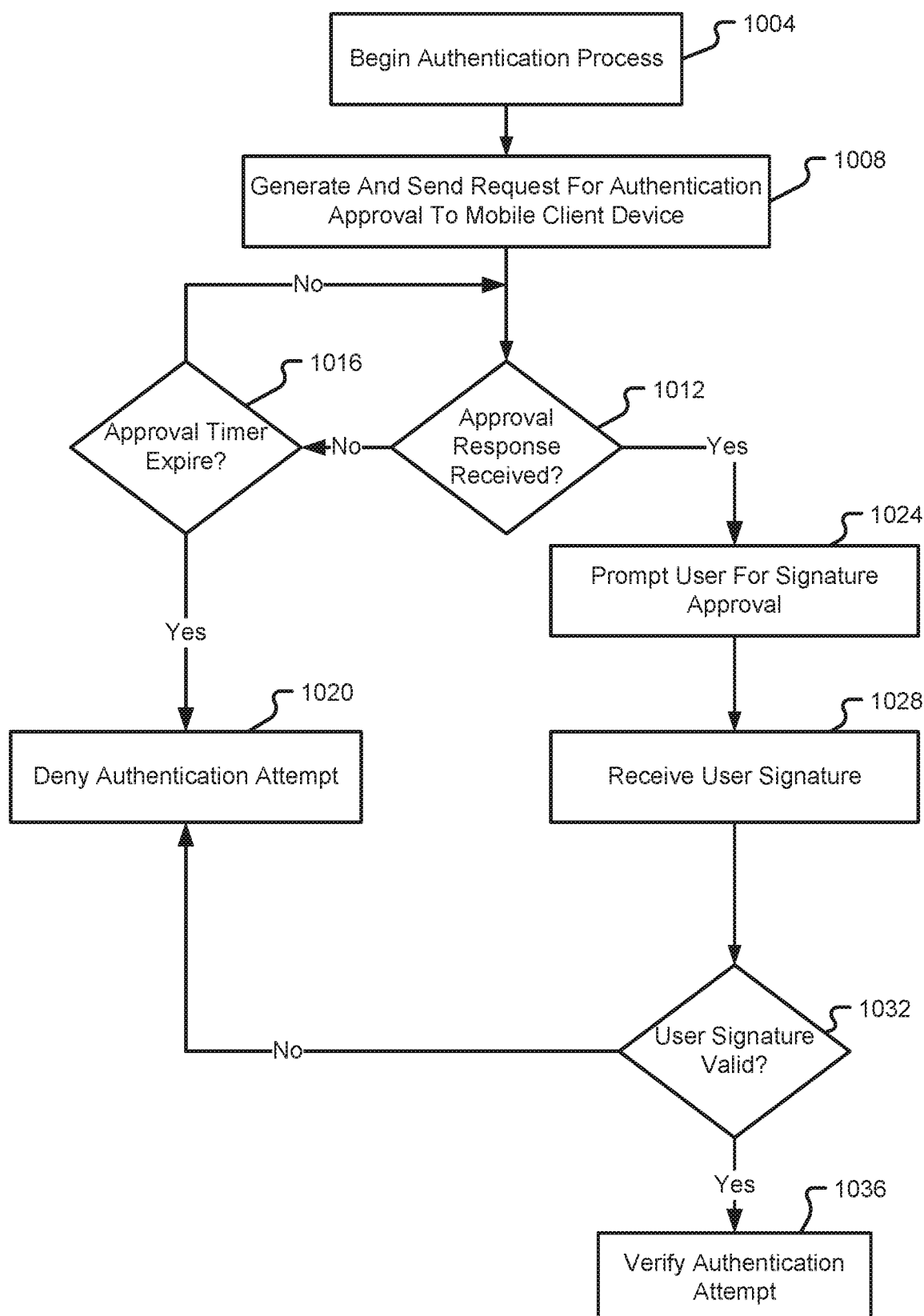
FIG. 10 is a flow chart depicting a fifth authentication method in accordance with at least some embodiments of the present disclosure.

With reference now to FIGS. 9A, 9B, and 10, another authentication process will be described in accordance with at least some embodiments of the present disclosure. This particular authentication process may be enabled by the server 116 executing challenge/response instructions 148. The process may also utilize a form of biometric authentication (e.g., signature authentication), which may be afforded by the facial recognition instructions 132 or similar biometric analysis instructions. Although the process will be described in connection with authenticating a single user 112, it should be appreciated that the process can be used to authenticate one or multiple users at the same time without departing from the scope of the present disclosure. It should also be appreciated that the process depicted in FIGS. 9A and 9B may correspond to a one-step authentication process or a two-step authentication process without departing from the scope of the present disclosure. Specifically, while FIGS. 9A and 9B are depicted as showing a sequential process, it should be appreciated that a single message can be presented to the user that simultaneously requires the user 112 to sign to validate in a single authentication step.

The process begins at step 1004 when a user 112 invokes an authentication process. This step may be similar or identical to step 704. Once the process is invoked, the authentication server 116 may generate and send a request for authentication approval to a client device 108 operated by the user 112 (step 1008). In some embodiments, the request may be transmitted back to the client device that was used to initiate the authentication process. In some embodiments, the request may be transmitted to a client device 108 having a known association with the user 112 that initiated the authentication process. The request, when received at the target client device 108, may cause the client device 108 to generate and display a prompt to the user 112 requesting whether the user 112 desires to approve or decline the authentication process (step 1012). In some embodiments, a timer may be started when the initial request is sent to the client device 108. If there is no approval response received from the client device 108 within a predetermined amount of time as indicated by the timer (step 1016), then the authentication attempt may be denied (step 1020). In some embodiments, the authentication server 116 may keep open the ability to receive a valid approval indication from the client device 108 for a predetermined amount of time. If the user 112 declines the authentication process or the timer expires, then the authentication attempt will be denied.

If, however, the user 112 selects the approval input 604 before the timer expires, then the method continues by prompting the user for an approval signature (step 1024). As shown in FIG. 9B, the user's 112 mobile client device 108 may have its user interface updated to include a prompt section 908 along with a signature section 904. The prompt section 908 of the user interface may provide the user 112 with instructions for responding to the prompt whereas the signature section 904 may provide the user 112 with an area to input a signature or other type of information that proves an identity of the user 112. The user's signature may be input at the signature section 904 (step 1028). In some embodiments, the signature may be analyzed within an application of the mobile client device 108 or the signature may be sent back to the authentication server 116 for analysis against known user signatures. If the user's signature is determined to be valid (step 1032), then the authentication process may be verified and the user may be allowed access to a protected asset (step 1036). If the user's signature is not determined to be valid, then the authentication attempt may be denied (step 1020). Signature analyzation or validation may include or be performed using any known or yet-to-be developed instructions, methods, systems, or techniques for analyzing and/or validating a signature.

In some embodiments, the authentication process depicted and described in connection with FIGS. 6A, 6B, and 7 may be augmented/enhanced with the authentication process depicted and described in connection with FIGS. 9A, 9B, and 10. In other words, after facial recognition has been performed, then additional user input may be required in the form of a signature. Such an enhanced authentication process may be reserved for authenticating transactions having at least a predetermined monetary value associated therewith because the additional interactions may not be as desirable to the user 112, but may be desirable in the form of additional security for higher-value transactions.

Figure 11:
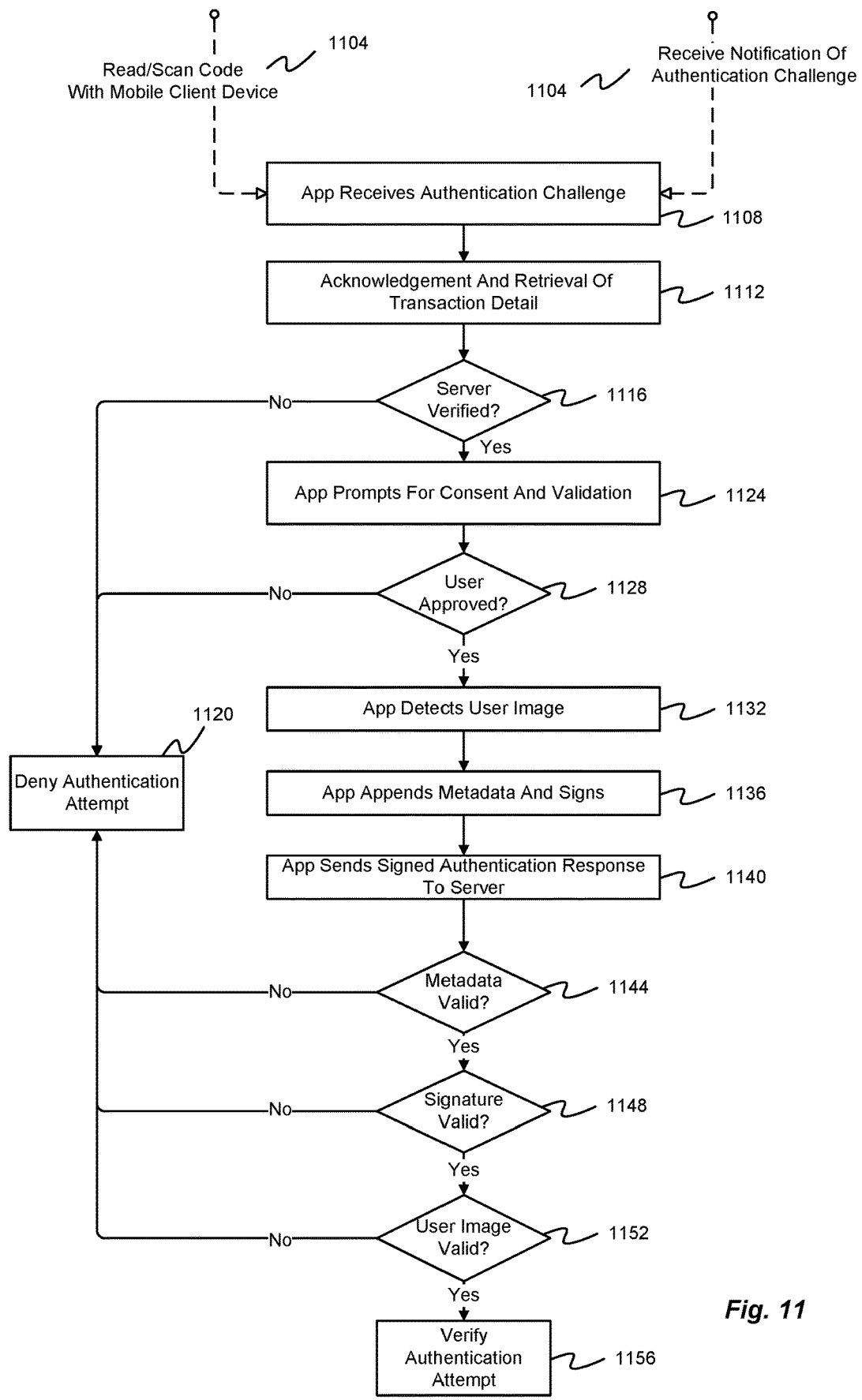
FIG. 11 is a flow chart depicting a sixth authentication method in accordance with at least some embodiments of the present disclosure.

With reference now to FIG. 11, another authentication process will be described in accordance with at least some embodiments of the present disclosure. The process begins at steps 1104, 1108 when an application of a client device 108, such as but not limited to a mobile client device, receives an authentication challenge (step 1108), for example, by reading or scanning an optical code, such as a barcode or QR code, or by receiving a notification, such as a push notification (step 1104). The process may continue with the application acknowledging the authentication challenge to and/or attempting to retrieve one or more transaction details from server 116 (step 1112). The server 116 may determine whether the authentication challenge is registered in the server 116 and/or whether the authentication challenge is associated with, or intended for, the client device 108 (or the user 112 of the client device 108) (step 1116). If the server 116 determines that the authentication challenge is not registered or is not associated with the client device 108 or user 112, the authentication attempt may be denied (step 1120). If the server 116 verifies the authentication challenge, the application of the client device 108 may generate and display a prompt to the user 112 requesting whether the user 112 desires to approve or decline the authentication process (step 1124). In some embodiments, the application may keep open the ability to receive a valid approval indication from the user 112 for a predetermined amount of time. If the user 112 declines the authentication process (step 1128) or a timer tracking the predetermined amount of time expires, then the authentication attempt may be denied (step 1120). If the user 112 approves the authentication process (step 1128), the process continues with the application detecting a user 112 within an image frame (step 1132). Similar to that described with respect to various embodiments herein, the user's 112 image may be obtained with a camera of the client device 108. Alternatively or additionally, the user's 112 image may be obtained with another camera, such as but not limited to a camera of another computing device 204 and provided to the application of the client device 108 (step 1132). In some embodiments, the application may then include or append metadata with the user's 112 image data (step 1136). Non-exhaustive examples of metadata that may be included or appended with the user's 112 image data include an authentication challenge ID, a client device 108 ID, a device owner or user 112 ID, a timestamp, etc. Some of this metadata can help prevent against replay attempts by unauthorized users. The application may include a Message Authentication Code (MAC) or the like, or may digitally sign the user's 112 image data and any metadata appended therewith (step 1136). Thereafter, the application sends an authentication challenge response including the user's 112 image data, and digital signature or MAC, to the server 116 (step 1140). The authentication challenge response may be encrypted prior to sending to the server.

Upon or after receipt of the authentication challenge response, the server 116 can, after any decryption, validate any metadata included with the response (step 1144), validate the signature or MAC (step 1148), and determine whether the user's 112 image is valid (1152). The server 116 may determine whether the user's 112 image is valid using, for example, the facial recognition instructions 132 or similar biometric analysis instructions. If the server 116 determines that any of the metadata, signature/MAC, or user's 112 image is not valid, the authentication attempt may be denied (step 1120). If the server 116 determines that any metadata, the signature/MAC, and the user's 112 image is valid, then the server 116 may verify the authentication attempt (step 1156) and enable the user 112 to access the protected asset. Verification of the authentication attempt may further include sending a message to the user 112 indicating a successful authentication has occurred, or the user 112 may simply be given access to the protected asset via, for example, the user's mobile client device 108 or another computing device 204.

Embodiment disclosed herein, in general, provide relatively strong, multi-factor authentication while requiring less or minimal user interaction. Many embodiments, for example, involve biometric or facial recognition to identify the user, thus avoiding a requirement that the user physically enter or key in user identification information, such as a username or email, and therefore, protect against key logger attacks.

It should be appreciated that the various methods depicted and described herein may be used in connection with authentication or other verification processes. For example, embodiments of the present disclosure are not necessarily limited to authentication processes, but rather may be used to ask for a user's non-reputable consent or approval for an action. For instance, a user may be asked to confirm, consent, or approve a financial transaction or similar type of activity that occurs at a remote server.

It should be appreciated that any combination of authentication processes depicted and described herein can be performed without departing from the scope of the present disclosure. Alternatively or additionally, any number of other authentication processes can be developed by combining various portions or sub-steps of the described authentication processes without departing from the scope of the present disclosure.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. A method of authenticating a user, the method comprising:
   detecting a user within an image;
   using the image, analyzing a biometric feature of the user;
   in response to analyzing the biometric feature of the user, identifying an enrolled user by determining that the biometric feature of the user corresponds to a valid biometric feature of the enrolled user; and
   in response to determining that the biometric feature of the user corresponds to a valid biometric feature of an enrolled user, and based on the identification of the enrolled user, identifying a client device associated with the enrolled user and requiring completion of a challenge at the client device to continue authentication.

2. The method of claim 1, wherein the challenge is transmitted by a push notification.

3. The method of claim 2, wherein the push notification causes the client device to display a prompt that includes an approve input and a decline input.

4. The method of claim 2, wherein the push notification is generated automatically and without user input.

5. The method of claim 1, further comprising receiving the image from another client device that is different from the client device associated with the user.

6. The method of claim 5, further comprising providing an optical code for display at the another client device.

7. The method of claim 6, wherein the optical code is encoded with the challenge.

8. The method of claim 7, wherein requiring completion of the challenge at the client device associated with the user requires scanning of the optical code by the client device associated with the user.

9. The method of claim 1, wherein the biometric feature comprises a facial feature of the user, wherein determining that the biometric feature of the user corresponds to the valid biometric feature of the enrolled user comprises generating a biometric template based on the biometric feature and comparing the biometric template with a stored template that was generated based on the valid biometric feature of the enrolled user.

10. The method of claim 1, further comprising receiving the image from the client device.

11. The method of claim 10, wherein the client device is a mobile device of the user.

12. The method of claim 1, wherein the challenge comprises one or more graphical user interface elements configured to receive an access code at the client device from the user.

13. The method of claim 12, wherein the one or more graphical user interface elements comprise a data entry grid comprising a plurality of predefined areas populated with data.

14. The method of claim 13, wherein a layout of the data populating the predefined areas is dynamically generated.

15. The method of claim 1, wherein the client device is associated with an identifier that is maintained in a user authentication database in association with an identification of the user and in association with the biometric feature of the user.

16. A system for authenticating a user, the system comprising:
   a processor;
   memory storing executable instructions, that when executed by the processor, cause the processor to:
      detect a user within an image;
      using the image, analyze a biometric feature of the user;
      in response to analyzing the biometric feature of the user, identify an enrolled user by determining that the biometric feature of the user corresponds to a valid biometric feature of the enrolled user; and
      in response to determining that the biometric feature of the user corresponds to a valid biometric feature of an enrolled user, and based on the identification of the enrolled user, identify a client device associated with the enrolled user and require completion of a challenge at the client device to continue authentication.

17. The system of claim 16, wherein the executable instructions, when executed by the processor, further cause the processor to transmit the challenge by a push notification that causes the client device to display a prompt that includes at least one of an approve input or a decline input.

18. The system of claim 16, wherein the challenge comprises one or more graphical user interface elements configured to receive an access code at the client device from the user.

19. The system of claim 16, wherein the executable instructions, when executed by the processor, further cause the processor to provide an optical code encoded with the challenge to another device different than the client device for display at the another device, and wherein requiring completion of the challenge at the client device requires scanning of the optical code by the client device.

* * * * *